May 9, 1933.   E. F. W. ALEXANDERSON   1,907,471
INDICATING SYSTEM FOR AIRCRAFT

Filed Nov. 16, 1931

Inventor:
Ernst F. W. Alexanderson,
by *Charles E. Pullan*
His Attorney.

Patented May 9, 1933

1,907,471

UNITED STATES PATENT OFFICE

ERNST F. W. ALEXANDERSON, OF SCHENECTADY, NEW YORK, ASSIGNOR TO GENERAL ELECTRIC COMPANY, A CORPORATION OF NEW YORK

INDICATING SYSTEM FOR AIRCRAFT

Application filed November 16, 1931. Serial No. 575,205.

My invention relates to indicating equipment for aircraft and more particularly to means for indicating on an aircraft the proximity of other craft.

One of the presently existing problems in connection with safe flying arises from the fact that as many air craft are now constructed the pilot does not have a clear vision all about the craft. For this reason danger arises, particularly in areas of congested air traffic, from collision between aircraft. It may readily occur, for example, with many airplanes as now constructed, that two craft approaching a common landing field may collide without either pilot seeing the other craft.

One of the objects of my invention therefore is to provide a method and means whereby an indication may be produced on aircraft of the proximity of other aircraft.

Another object of my invention is to provide an indication on each aircraft which is an imitation of, or bears a relation to, the sounds produced by the two craft when in proximity to each other. In this connection it is of course recognized that the principal sounds produced about an air craft are those produced by the propeller. The sound of one craft however is not readily heard on another craft and accordingly the sound of two craft in proximity to each other, and which a by-stander would hear, does not reach the ear of the pilot of either of the two craft. Accordingly, one of the objects of my invention is to produce an indication on each craft, as for example, a sound which approximates the true sound produced by the two craft, which indication is produced only when the two craft are in proximity to each other.

A further object of my invention is to produce simple and economical means which may be practically carried by aircraft whereby the desired result is accomplished.

Figure 1:
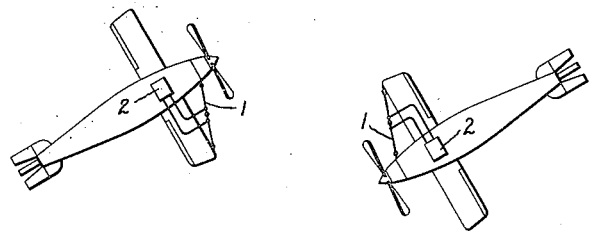
Figure 2:
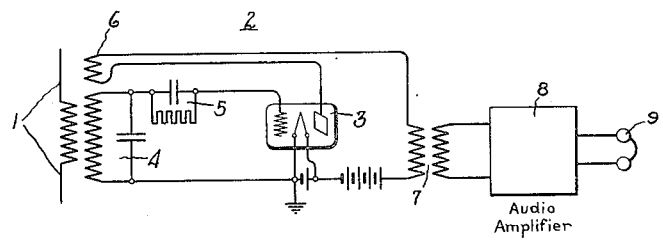
Figure 3:
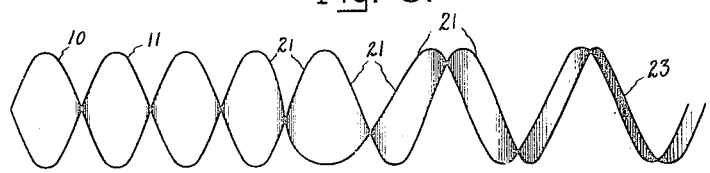
Figure 4:
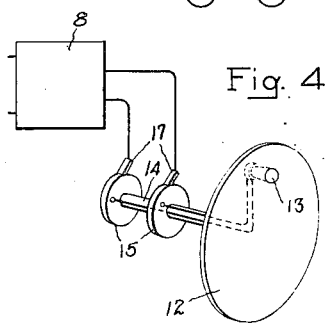
Figure 5:
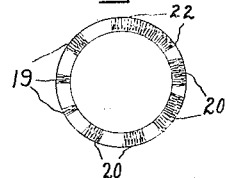

The novel features which I believe to be characteristic of my invention are set forth with particularity in the appended claims. The invention itself, however, both as to its organization and method of operation, together with further objects and advantages thereof may best be understood by reference to the following description taken in connection with the accompanying drawing in which Fig. 1 represents air craft equipped with apparatus in accordance with my invention; Fig. 2 represents one circuit arrangement whereby my invention may be carried into effect; Fig. 3 indicates certain operating characteristics thereof; Fig. 4 represents a modification; and Fig. 5 represents the nature of indication produced by the equipment shown in Fig. 4.

Referring to the drawing, I have shown in Fig. 1 two air craft, each of which is provided with an antenna 1 so arranged on the craft that they are electrically effected by the movement of the propeller of the respective craft. While the desired effect may be produced in many different ways, as shown in the drawing, the antenna comprises a simple doublet, one end of which is connected to a wing of the craft and the other end of which is supported by the craft at a point near the propeller. A suitable oscillating detector 2, which may be carried at any suitable point on the craft, is connected to the antenna 1 and arranged to have its frequency controlled in accordance with the characteristics of the antenna. As thus arranged the antenna has the same effect as a rotating condenser mounted on the propeller shaft and connected to control the frequency of the oscillating detector.

In Fig. 2 I have shown a circuit arrangement which may be employed for the purpose described in connection with Fig. 1. This figure represents an oscillating detector 2 comprising an electron discharge device 3 having a grid circuit including an oscillatory circuit 4, and a grid leak and condenser combination 5. The anode circuit includes a coil 6, which is coupled to the inductance of the oscillatory circuit 4 thereby to cause the device to produce oscillations, and the primary winding of the audio transformer 7. The secondary winding of the audio transformer is connected to an audio amplifier 8, the output of which is connected to a pair of headphones 9, which may be worn by the operator. The antenna 1 may be coupled to the oscillatory circuit 4 in any suitable way, but is shown in the drawing as inductively coupled thereto.

As thus arranged, the device 3 generates oscillations having a frequency determined by the oscillatory circuit 4 and by the constants of the antenna 1, which is of course variable, dependent upon the position of the propeller with respect to the antenna. The circuit 4 may be adjusted to cause the system to oscillate at any frequency at which the best operation is secured, but I contemplate the use of frequencies in the short wave length range. The use of frequencies having a wave length of from one to five meters, may be advantageous from the viewpoint of interference with radio apparatus employed for other purposes. The oscillating detectors of all of the craft equipped with my invention are adjusted for normal operation at the same frequency.

A device similar to that shown in Fig. 2 is of course mounted upon each of the air craft as shown whereby mutual interference is produced between the different devices when the different craft come within a predetermined range of each other. This range should be relatively short but sufficiently great to cause the desired interference to be produced when the air craft are within a range in which it is desirable for each pilot to be informed as to the presence of other craft. Due to this interference oscillations of audio frequency are produced in the output circuit of the device 3 equal to the difference in frequency between oscillations generated by the respective detector and oscillations received from the corresponding device on another craft. This audio frequency is amplified by the device 8 and produces in the headphones 9 an audible response varying in relation to the sound produced by the propellers of the two craft with the result that the pilot is made aware of the presence of the other craft within the said predetermined range of is own craft and is advised relative to movement of that craft.

This operation may be better understood from Fig. 3 in which curve 10 may be considered to indicate the frequency variation produced by the system 2 on a particular air craft. It will be seen that this frequency alternately increases and decreases in accordance with the movement of the propeller and of course at a rate dependent upon the speed of the propeller. Preferably the range of variations is somewhat broader than the audio range, or about one per cent of the normal frequency of the oscillating detector.

The curve 11 represents the frequency of oscillations received from a different craft within a predetermined range of influence of the two oscillating detectors. At the different points at which the two curves 10 and 11 cross the frequency radiated from the craft and that received thereby are of equal frequency, whereas on each of the opposite sides of these oscillation points of audio frequency equal to the difference in frequency between the transmitted and received waves are produced and amplified by the device 8 and converted into sound by the headphones 9. At points on the curves at progressively increasing distances from the crossing points the difference in frequency increases in pitch as is indicated by the gradation in shading of the drawing until it becomes inaudible as indicated by the absence of shading near those portions of the curve remote from the crossing points. The range over which this audible frequency is produced and the pitch of the audible tone varies in accordance with the relative movements of the two propellers and causes the sound produced in the headphones to produce an impression upon the ear of the operator somewhat similar to that which is received by one not in an aircraft but who hears the combined sound of the two propellers.

Thus, for example, a person on the ground may readily recognize the sound that is produced by the propeller of a single aircraft and further, this sound is readily distinguishable from a sound which is produced by two air craft operating within the audible range of the observer. Further, one receives a different impression when one of the craft varies its speed or changes its course with reference to the observer. These impressions, however, are entirely lost to the pilot of one of the two craft for the reason that he only hears the sound of his own craft. By my invention an imitation of these sounds is produced in the headphones of the operator such that by listening thereto he is able to receive an impression similar to that which an observer would receive standing on the ground and listening to the two craft.

In Fig. 4 I have shown a modification of the invention in which the headphones 9 are replaced by a visual indicating device. This indicating device comprises a rotating disc 12 carrying near its periphery a suitable glow discharge lamp 13. This disc 12 is mounted on a shaft 14 carrying a pair of slip rings 15 connected respectively to the opposite electrodes of the glow discharge lamp. Brushes 17 cooperating with the respective slip rings 15 are connected to the output of the amplifier 8. As thus arranged, the audio electromotive forces which are supplied to the headphones 9 of Fig. 2 are in Fig. 4 supplied to the glow discharge lamp and cause light to be produced thereby. This rotating disc is mounted preferably within the view of the operator of the craft. When the craft is operating at a distance from another craft, no audio frequencies are produced in the output circuit of the amplifier 8 and accordingly the glow discharge device is not illuminated. When a second craft, however, comes within the range of influence of the device 2 carrying the lamp 13, this lamp becomes illuminated and the pilot sees a ring of light defining the path of travel of the lamp. This ring of light, however, varies in its different portions in accordance with the difference in frequency between the radiating and received oscillations, as shown for example in Fig. 5. Thus, for example, short spots of light 19 are shown in the ring produced by the audio frequencies which occur at the point of intersection of the curves 10 and 11 at the left-hand of Fig. 3. These spots of light become longer as indicated at 20 corresponding to portions 21 of the curves of Fig. 3. A long spot of light 22 is produced corresponding to that portion 23 of the curves of Fig. 2.

Fig. 5, however, is presented merely to illustrate the idea of the varying ring of light which is produced by the two interfering waves rather than to present an accurate illustration of the light figure produced at a particular relation of the light waves. This figure of course rapidly changes in accordance with the relative positions of the propellers. If desired, the lamp 13 may be continuously illuminated as by a polarizing source, the light being modulated when the two craft come within the mutual influence range of each other. When so employed a continuous ring of light is normally produced whereas when the two craft approach each other this ring is modulated in accordance with the relative positions of the two propellers.

It may of course occur in the operation of the system described that a certain amount of amplitude modulation of the oscillations produced by the system 2 occurs as a result of the frequency modulation thereof. This amplitude modulation, however, is slight and may not be noticeable in the headphones 9, but when noticeable, produces a sound representing the sound of the propeller.

While I have shown a particular embodiment of my invention it will of course be understood that I do not wish to be limited thereto since many modifications, both in the circuit arrangement and in the instrumentality employed may be made, and I contemplate by the appended claims to cover any such modifications as fall within the true spirit and scope of my invention.

What I claim as new and desire to secure by Letters Patent of the United States is:

1. The method of indicating the proximity of two aircraft on each of said craft which includes radiating oscillations from each craft and utilizing the mutual interference between the radiated oscillations from the two craft to produce an indication on each craft.

2. The method of indicating the proximity of two aircraft on each of said craft, which includes radiating oscillations from each craft, modulating the frequency of the oscillations radiated from each craft, and producing an indication in accordance with the interference between the oscillations radiated from the two craft when in proximity to each other.

3. The method of indicating the proximity of two aircraft which includes electrically producing an indication upon each craft having a relation to the positions in rotation of the propellers of both craft.

4. The method of protecting aircraft against collision, which includes producing an indication on each craft and varying said indication in accordance with the positions in rotation of the propellers of the respective craft and another craft when said two craft are in proximity to each other.

5. The method of indicating the proximity of two aircraft, which includes transmitting oscillations from each aircraft to the other aircraft having a frequency bearing a definite relation to the position in rotation of the propeller of the respective aircraft from which said oscillations are transmitted, beating together the oscillations received on each craft with oscillations having the frequency of oscillations transmitted therefrom and producing an indication in accordance with the beat frequency produced.

6. In a system for protecting aircraft against collision, a high frequency carrier wave transmitter on each aircraft, each of said carrier wave transmitters having a certain range of influence, and each of said carrier wave transmitters having means associated therewith to produce a desired indication in response to interference produced between the wave radiated from the respective transmitter and the wave radiated by the transmitter on another aircraft within its respective range.

7. In a system for protecting aircraft against collision, an oscillating detector arranged on each aircraft to be protected, and provided with means for radiating the oscillations produced thereby, said means on one aircraft being arranged to be affected by radiations from the corresponding means on other aircraft, and means on each craft responsive to the respective oscillating detector for indicating the proximity of other craft.

8. In a system for protecting aircraft against collision, means on each aircraft arranged to radiate oscillations modulated in accordance with the position in rotation of the propeller of the respective craft and to receive oscillations from other craft, and means on each craft jointly responsive to modulations of the oscillations produced on the respective aircraft and on other craft within the range of said means.

9. In a system for protecting aircraft against collision, means on each aircraft arranged to radiate oscillations and to receive oscillations from other aircraft, means on each craft to modulate the frequency of the oscillations radiated from the respective craft in accordance with the speed thereof, and indicating means on each craft responsive to the difference in frequency between oscillations radiated from the respective craft and oscillations received on the respective craft from other craft.

10. In a system for protecting aircraft against collision, a high frequency radiating oscillator arranged on each craft, each of said oscillators being arranged to be influenced by oscillations received from other aircraft and means connected in circuit with each of said high frequency oscillators to indicate when said oscillator is influenced by the oscillator of a different aircraft.

11. In a system for protecting aircraft against collision, a high frequency oscillating detector on each aircraft, each of said oscillating detectors being arranged to radiate oscillations to other craft and to receive oscillations therefrom, means on each craft for modulating the frequency of the respective oscillating detector in accordance with the speed of the respective craft, and means on each craft responsive to the difference in frequency between oscillations produced by the respective oscillating detector and oscillations received thereby from other aircraft.

12. In a system for protecting aircraft against collision, a high frequency oscillating detector on each aircraft, each of said oscillating detectors being arranged to radiate oscillations to other craft and to receive oscillations therefrom, means on each craft for modulating the frequency of the respective oscillating detector in response to movement of the propeller of the respective craft, and means on each craft responsive to the difference in frequency between oscillations produced by the respective oscillating detector and oscillations received thereby from other aircraft.

13. The combination on an aircraft, of an antenna arranged to be electrically influenced by the position in rotation of the propeller of said craft, an oscillator coupled to said antenna, and an indicating device on said craft controlled by oscillations produced by said oscillator.

14. The method of indicating the proximity of two aircraft which includes radiating a carrier wave from each craft, modulating the frequency of each of said carrier waves in accordance with the positions in rotation of the propeller of the craft from which the respective wave is radiated, and producing an indication on each craft dependent on the instant relation of the frequencies of said two carrier waves.

15. In a radio system for aircraft, an antenna arranged on an aircraft in proximity to the propeller whereby its natural period is controlled by the position of the propeller, an indicating device, and means for utilizing said natural period to control said indicating device.

16. The method of indicating the proximity of two aircraft which includes producing an electric current upon each craft having a relation to the positions in rotation of the propellers of both craft, and producing sound waves in accordance with said currents.

In witness whereof, I have hereunto set my hand.

ERNST F. W. ALEXANDERSON.

DISCLAIMER 1,907,471.—*Ernst F. W. Alexanderson*, Schenectady, N. Y. INDICATING SYSTEM FOR AIRCRAFT. Patent dated May 9, 1933. Disclaimer filed April 19, 1934, by the assignee, *General Electric Company*.

Hereby enters the following disclaimer to claim 1 of the said Letters Patent, which is in the following words, to wit:

"1. The method of indicating the proximity of two aircraft on each of said craft which includes radiating oscillations from each craft and utilizing the mutual interference between the radiated oscillations from the two craft to produce an indication on each craft."

[*Official Gazette May 8, 1934.*]